United States Patent [19]

Garver

[11] 4,335,320
[45] Jun. 15, 1982

[54] MULTI-ZONE ENERGY SUPPLY CONTROLLER

[75] Inventor: Thomas L. Garver, Kannapolis, N.C.

[73] Assignee: W. A. Brown & Son, Inc., Salisbury, N.C.

[21] Appl. No.: 121,158

[22] Filed: Feb. 13, 1980

[51] Int. Cl.³ .......................... G05B 11/00; H02J 13/00
[52] U.S. Cl. .......................................... 307/39; 165/28
[58] Field of Search ....................... 307/39, 40, 41, 38, 307/35, 117; 165/25, 27, 28

[56] References Cited

U.S. PATENT DOCUMENTS

| | | | |
|---|---|---|---|
| 3,058,663 | 10/1962 | Barnard | 165/25 X |
| 3,933,197 | 1/1976 | Zimmer et al. | 165/27 X |
| 4,141,407 | 2/1979 | Briscoe et al. | 307/35 X |
| 4,147,203 | 4/1979 | Rayfield | 165/29 X |
| 4,228,511 | 10/1980 | Simcoe et al. | 307/39 X |

Primary Examiner—Michael L. Gellner
Assistant Examiner—James L. Dwyer
Attorney, Agent, or Firm—Richards, Shefte & Pinckney

[57] ABSTRACT

A controller for the power supply system of a building structure divided into multiple zones provides a time-programmer and a load shedder for controlling the availability of separate heating, ventilation, and air-conditioning apparatus for individual zones and the separate apparatus associated with the building and includes switches for overriding the time programmer to allow selected apparatus to operate at will for a short period. The controller includes thermostats monitoring the temperature in the zones and operating the HVAC apparatus during certain temperature conditions, a meter for displaying the monitored temperature, and switches for selectively disconnecting the thermostats from the respective zone apparatus and connecting them to the meter while simultaneously connecting a dummy resistor to the respective zone apparatus in lieu of the thermostat. Hour meters and counters on the controller panel monitor and indicate elapsed running time and number of cyclings for certain elements of the apparatus, and signal lights indicate the operating status of certain elements.

6 Claims, 3 Drawing Figures

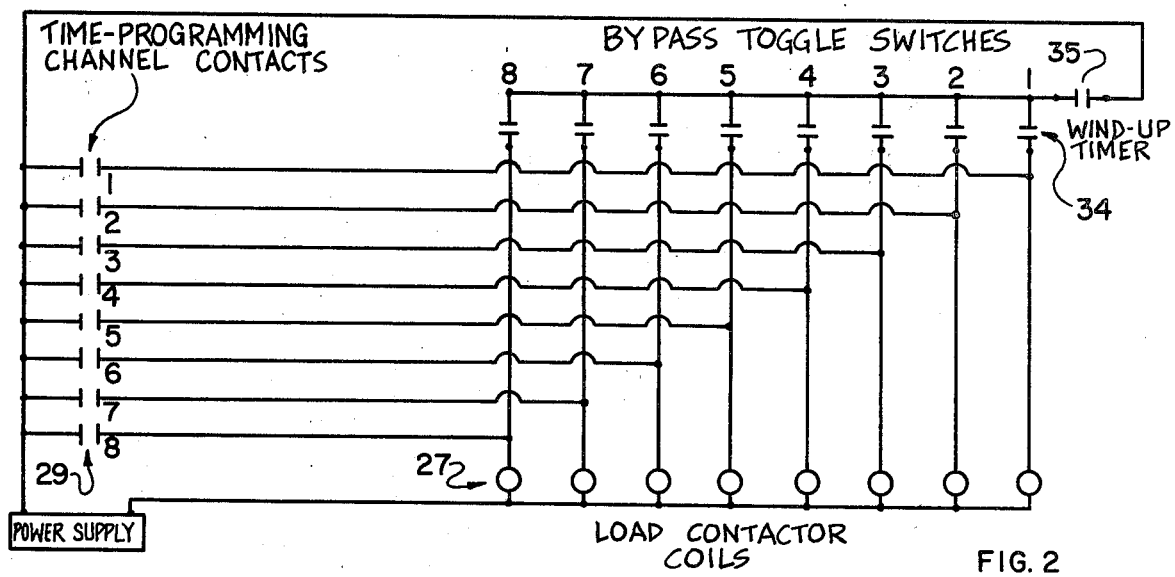
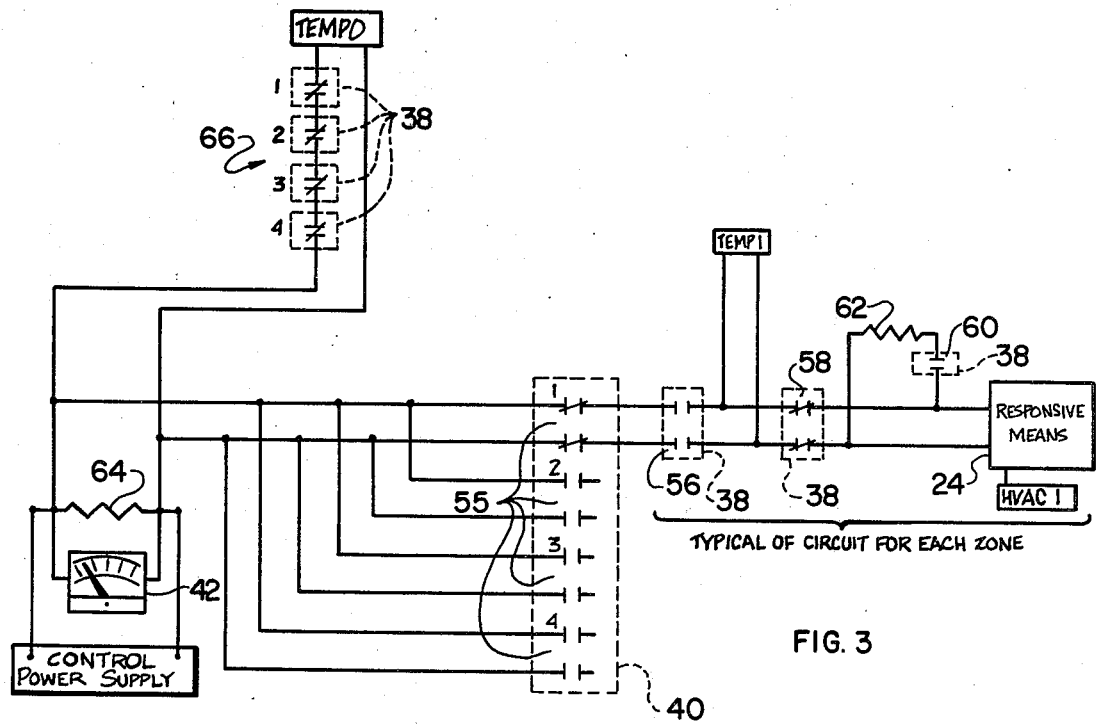

MULTI-ZONE ENERGY SUPPLY CONTROLLER

BACKGROUND OF THE INVENTION

Many building structures have people, equipment, and lighting requiring energy or power for environmental comfort, work operations, visual acuity and safety, refrigeration and other purposes. These buildings are frequently divided into zones having separate heating, ventilating, and air-conditioning apparatus for each zone, and environmental condition monitors are provided for enabling the HVAC (heating, ventilating, and air-conditioning) apparatus to be operated automatically as needed for maintaining the environmental conditions desired in each of the zones.

Family-type restaurants serving steaks or seafood are typical of such buildings, which may have two or more dining areas, a kitchen area, a serving area, HVAC apparatus for each area, significant refrigeration equipment, extensive indoor and outdoor lighting, and assorted other apparatus requiring various schedules of operation and having various degrees of loading. Such apparatus and equipment is normally electrically powered and controlled, and it is preferable for the controls to be automatic under normal circumstances and that much of the apparatus should be turned off completely during certain hours of the day or night to eliminate waste of energy. Also, since electrical utility companies set their rates according to the peak demand load required by the customer, it is desirable to have controls for monitoring the demand load and for shedding electrical loads at a predetermined demand so that the peak demand cannot exceed a certain level as predetermined by correlation of electrical rates and the apparatus which must be maintained in operation at all costs.

Much of the apparatus is not needed at certain times of the day, and it is desirable to have automatic programs to assure that this apparatus is not inadvertently operated during those times; for instance, parking lot lights need not operate in the daytime, cooking equipment need not operate while the restaurant is closed, and the HVAC apparatus may be turned off when the restaurant closes and should be restarted shortly before opening.

Very sophisticated control equipment is commercially available for the aforementioned control functions, as well as for the automatic environmental control functions which maintain comfort conditions in the HVAC zones. Controls for performing the above described functions, as well as many others, are available from HONEYWELL, INC., Minneapolis, Minn., and certain of these functions are described in more detail in the description hereinafter of the preferred embodiment of the present invention. Honeywell W977 Management Systems, W972B Watt Transducers, W973 Single-zone Logic Panels, W974 Setback/Setup Modules, and T7047C Electric Thermostats and T7067B Transmitters therefor are items representative of the sophisticated control equipment available. Other commercially available control apparatus such as electronic humidistats, modulating valve and damper actuators, filter condition sensors, air flow sensors, and assorted other control elements are well known in the HVAC art for use with the more sophisticated controls.

However, while the above-mentioned controls have been available and in use in various customer- or contractor-designed applications, they have never been combined and utilized according to the present invention, in which a standardized control panel combines the circuitry, functions, indicating elements, and controls therefor in a central location at which predetermined load time programs and load limits can be set, controlled, and observed for the entire energy supply system of a multi-zoned, multi-load building structure. Such standardization and centralization is highly efficient for initial design and allows the manager of the building structure to maintain complete control over the structure without great technical expertise or burden on his time. Not only does the panel of the present invention provide pre-programmed control during normal operations but also allows management-by-exception when certain apparatus needs to be operated contrary to the time-programming, and provides for management observation of outdoor temperature at the panel, as well as of indoor temperature in each monitored zone by reading the signals from the same monitoring elements that control the automatic operation of the HVAC apparatus for each zone.

SUMMARY OF THE INVENTION

Briefly described, the present invention provides a controller for the power supply system of a structure having multiple zones therein with separate heating, ventilating, and air-conditioning apparatus for individual zones, the structure having other separate apparatus associated with it and having means at the controller for automatically selectively controlling the availability for operation of at least some of the separate apparatus on power demand and time bases; and the improvement includes means at the controller for selectively overriding the availability controlling means for predetermined periods of time for selectively allowing at least one of the separate apparatus to be available to operate independent of the aforesaid controlling on time bases.

Preferably, the controller includes means associated with the separate apparatus for monitoring environmental conditions in at least some of the zones, means responsive to the monitoring means and connected thereto for causing the corresponding separate apparatus to operate during predetermined environmental conditions, and means for selectively determining and displaying the measure of the environmental conditions as sensed by the monitoring means; and the invention further includes means at the controller for selectively disconnecting the monitoring means from the responsive means, connecting the monitoring means to the determining and displaying means for determining and displaying the sensed environment condition measure, and connecting a dummy load to the responsive means while the monitoring means is so disconnected.

In the preferred embodiment of this invention, the controller includes means for monitoring and indicating the elapsed time and number of cyclings of at least some of the elements of the separate apparatus and for indicating the operating status of at least some of those elements.

BRIEF DESCRIPTION OF THE DRAWINGS

FIG. 2 is a schematic wiring diagram of the bypassing switches for the time-programming channels of the controller, and FIG. 3 is a schematic wiring diagram of the selective zone-temperature monitoring and displaying circuits.

DESCRIPTION OF THE PREFERRED EMBODIMENT

Figure 1:
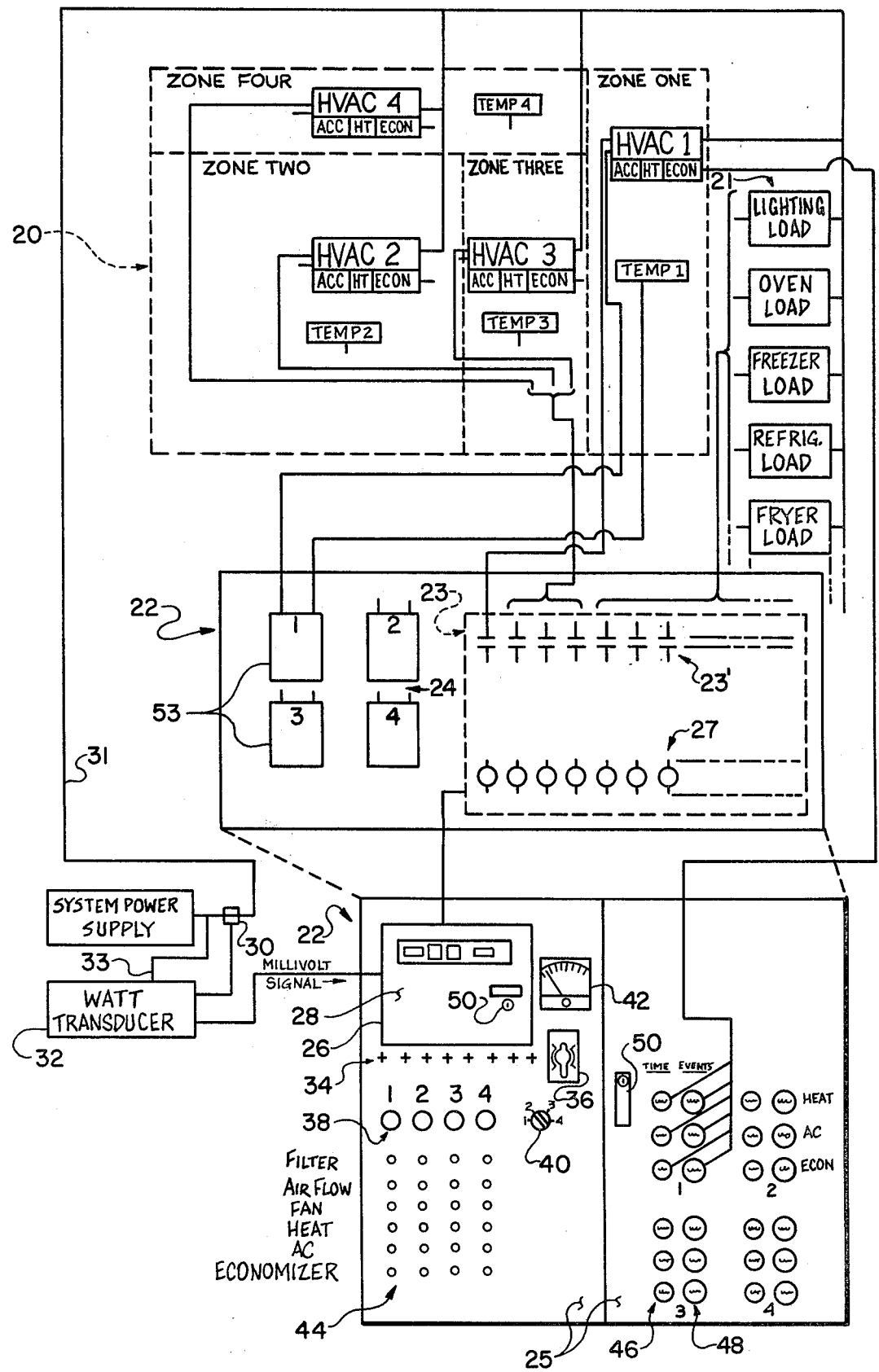
FIG. 1 is a schematic diagram of a multi-zoned structure and the arrangement of its energy-requiring loads and controller panel therefor.

An energy supply controller for a multi-zone structure is shown diagrammatically in FIG. 1, where a building structure 20 is indicated and labeled as divided into four heating, ventilating, and air-conditioning (HVAC) zones, all in broken lines. Typically, in a one-story structure for a family-style steak restaurant for which the present invention has been found most useful initially, the HVAC apparatus for each zone is roof mounted in preassembled modules located over each zone as indicated by the blocks labeled HVAC 1 and HVAC 4 located within the structure 20 as shown in FIG. 1, which blocks also represent the electrical loads for such apparatus. Typically, also, the temperature within each zone is monitored by a sensor placed in the zone, such as the thermistor-resistor sensors of Honeywell T7047C electronic thermostats indicated by the boxes labeled TEMP 1-TEMP 4 in FIG. 1 within the respective zones in the structure. Use of the numerals 1-4 in FIGS. 1 and 3 indicates that the elements so-labeled are associated with the respective HVAC zones one to four.

Other power- or energy-requiring loads 21, in addition to the above described HVAC apparatus loads, such as parking lot lights, outdoor signs, interior lighting, ovens, fryers, freezers, refrigerators, etc. are located within and without the structure 20 as convenient, exemplary ones being shown in blocks labeled accordingly in FIG. 1 but not shown located within the structure 20, and all the loads may be controlled by an energy supply controller panel 22 as shown in FIG. 1. This panel 22 may be located within the structure as desired for easy access and supervision by the restaurant manager.

A typical controller panel 22 houses twenty-five electrical load contactors or relays 23 having contacts 23' for controlling HVAC or other electrical load circuits (representative loads and contacts 23' are shown schematically connected in FIG. 1), and of course each of these circuits may have one or more other electrical contactors or relays (not shown) included therein and subordinate to the controller panel 22 contactors 23 for control of individual items of apparatus within each electrical load and in turn controlled by manual or automatic controls suitable to the individual load circuit. As contemplated in this preferred embodiment, some of the individual items of apparatus within the circuits may be automatically controlled for operation by other control means 24 responsive to signals from the thermostats TEMP 1-TEMP 4, as shown representatively in FIG. 1 connected between the thermostat TEMP 1 and the apparatus HVAC 1 (for clarity, similar connections for the other zones are omitted by FIG. 1, but are present in the embodiment).

The controller panel 22 is provided with doors or covers 25 which may be opened for access to the control elements and circuitry which need not be available or visible readily. Other control elements, as will be described hereinafter, are mounted on these doors 25 for ready observation, operation, and adjustment. A Honeywell W977 load management system unit 26 is typically mounted on the left-hand door 25 and is provided with its own door or cover 28 provided with a lock for control of access to its settable load demand limit controls and load time-programmer. As is well known in the art, the W977 unit provides 12 channels for load demand control and 8 channels for time-programming control, and the contactors 23 may be connected to these channels in a suitable pattern or distribution as further described hereinafter for control by the channels.

Current transformers 30, schematically illustrated in FIG. 1 by a box, monitor the current flowing in the electrical service mains 31 from the system power supply box so labeled and are connected to a Honeywell W972B watt transducer 32. The watt transducer 32 also has voltage connections 33 to the power supply mains 31, and converts the current signals and the voltage signals received from the service mains 31 to a millivolt output proportional to the true power consumption through the service mains 31. This millivolt signal is connected to the load management unit 26 for monitoring thereby for determining the necessity to shed electrical loads to prevent the load demand from rising above the predetermined level previously set into the unit 26.

The eight channels for time-programming located in the load management unit 26 control the coils 27 of the contactors 23 and through the contacts 23' thereof control the electrical loads respectively connected thereto, and each time-programming channel includes a set of timing contacts 29, as shown in FIG. 2, selectably normally open or normally closed. As is well known in the art, each channel may be programmed for at least two on and two off periods for each day of the week within the memory capacity of the unit 26. As also well known in the art, the unit 26 provides two bypass modes, one mode in which all channels are restored to the on condition for as long as left in that mode, the other bypass mode holding all channels for one hour in the condition existing at the instant of bypassing and then reverting to the predetermined time-programming at the end of the hour.

In the preferred embodiment of the present invention, a row of eight bypass toggle switches 34 are located on the panel door 25 immediately below the load management unit 26, and the switches 34 are respectively connected at one side of their single-pole single-throw contacts to one side of each of the eight time-programming channels or selected normally open contacts 29 of the load management unit 26, as shown schematically in FIG. 2, for selectively bypassing the contacts 29 of the time-programming channels which are connected in series with the respective coils 27 of the load contactors 23 for control thereof.

The toggle switches 34 are commonly connected at the other side of their contacts to one side of a normally-open contact 35 of a 30-minute windup timer 36, and the other side of the contact 35 is commonly connected to the other side of each of the eight time-programming channels or contacts 29, so that when the contact 35 is closed each of the eight time-programming channels or contacts 29 may be bypassed by closing the contact of its corresponding toggle switch 34, thereby paralleling a contact 29 with a corresponding toggle switch 34 contact in series with the contact 35. That is, the timer 36 must be wound up to close the contact 35 in order to enable bypassing the time-programming channels or contacts 29, and thereby the time-programming channels may be selectively bypassed as determined by the closing of the toggle switch 34 contacts for only a maximum of 30 minutes before manual attention is required to rewind the timer to extend the time of bypassing; otherwise, the contactors 23 and their respective electrical loads are returned to the control of the time-programming channels at the end of the 30-minute windup period.

As is well known in the HVAC and electrical service arts, the most desirable loads for shedding in a restaurant structure are those relating to HVAC and refrigeration, while all the electrical loads except refrigeration are susceptible to programming on time bases. Therefore, it is typical for the separate HVAC apparatus for each zone to be connected for concurrent control by both the load demand channels and the time programming channels, in series in effect, so that when a load demand channel has shed an HVAC load, it is not possible to bypass the load demand channel and operate the HVAC apparatus either through normal operation or through the time-programming channel associated therewith, or by use of the bypass toggle switch 34 associated with the respective time-programming channel.

Alternatively, a W977 load management system unit 26 may contain only the load demand management channels or the load time programming channels, and in the former alternative the present invention could not embody the bypassing or overriding feature. In the second alternative, the bypassing or overriding feature would operate as described hereinbefore to make power available selectively overridingly to the apparatus connected to each of the eight time programming channels. The twenty-five load contactors 23 typically included in the panel 22 may be divided amongst or shared by the load demand channels and the time programming channels as desired when both are present.

Four push button switches 38 are located in a row below the toggle switches 34, each of the switches 38 being assigned to one of the four HVAC zones in the structure. A zone selector switch 40 is located to the right of the switches 38 in the left hand door 25 and a micro-ammeter 42 calibrated to the TEMP 1-TEMP 4 electronic thermostats is located above the switch 40 for reading temperature when connected to a thermostat circuit, as explained hereinafter, by the switches 38 and 40.

Six status lights 44 are provided in a column below each of the zone push button switches 38 for providing a continual read-out of the operating status of individual elements (not shown) of apparatus in each of the HVAC zones to which the lights 44 are conventionally respectively connected (connections not shown). Typically, the first light 44 below each push button 38 indicates when lit that the air filter in the respective zone is not clogged, the second light indicates sufficient air flow in that zone when lit, the third light indicates fan motor operation, the fourth light indicates that heat is supplied to that zone, the fifth light indicates air-conditioning compressor operation in that zone, and the sixth light indicates that the "economizer" damper is admitting fresh air to that zone system.

Hour meters 46 and event counters 48 are disposed in pairs on the right hand door 25 of the panel 22 to record running time in hours and number of cyclings respectively for the heat, air-conditioning compressor, and economizer elements of the apparatus (as indicated by blocks labeled ACC, HT, and ECON respectively in FIG. 1) for each of the four HVAC zones in the structure 20. Each of the meters 46 and counters 48 is connected (as shown schematically in FIG. 1 for zone one) to its corresponding element of HVAC equipment in the respective zone in conventional fashion for monitoring and recording operation thereof and displays a digital readout on the panel 22.

Key locks 50 are provided in the access door 28 of the load unit 26 and in the right hand door 25 of the panel 22 for control of access to the interior of the panel 22. Within the panel 22 behind the doors 25, are located the aforesaid twenty-five load contactors 23 and four sets 53 of logic elements, one set 53 for each HVAC zone, each set 53 suitably conventionally intraconnected and in this embodiment including a Honeywell W973 Singlezone Logic Panel, a Honeywell W974B Setback/-Setup Module, a Honeywell T7067B Transmitter for a Honeywell T7047C Electronic Thermostat located in the space being monitored, and suitable control transformer equipment. The just-aforesaid sets 53 of logic elements comprise the aforesaid responsive control means 24, and are connected with the HVAC apparatus for each zone for responding to environmental conditions in each zone and are responsive to the respective monitoring means (such as the thermostats TEMP 1-TEMP 4) and connected thereto and to the respective HVAC apparatus in each zone for causing the corresponding HVAC apparatus in each zone to operate during the existence of predetermined environmental conditions as preset into the aforesaid logic elements, subject to the availability for operation of the HVAC apparatus as determined by the load management unit 26.

It is advantageous in the control of such a zoned system to be able to read the air temperature in each HVAC zone from the central controller panel 22, and it is also an initial cost advantage to read those temperatures from the same sensors which monitor the temperature for control purposes—in addition, such use of the controlling sensor elements assures credibility to the read-out. Therefore, circuitry as shown in FIG. 3 is used to selectively connect the temperature-calibrated micro-ammeter 42 selectively to the TEMP 1-TEMP 4 thermostats in each of the HVAC zones by use of the push button switches 38 and the zone selector switch 40. As shown in FIG. 3, the selector switch 40 has a pair of normally open contacts 55 connected into the thermostat circuitry for each HVAC zone, and upon moving the selector switch to a desired zone (shown at zone 1 in FIG. 3), the contacts 55 for that zone are closed, thus connecting one side of a pair of normally open contacts 56 in the zone 1 push button switch 38 to the micro-ammeter 42. The circuitry for the zone 1 thermostat TEMP 1 is connected between the other side of the contacts 56 and one side of a pair of normally closed contacts 58 in the zone 1 push button switch 38. The other sides of the contacts 58 are connected to the input leads for temperature signals for the responsive means 24 for zone 1. A normally open contact 60 in the zone 1 push button switch 38 is connected in series with a dummy load resistor 62 between the input leads for temperature signals for the responsive means 24 for zone 1. A loading resistor 64 connected across the terminals of the micro-ammeter 42 is normally connected also to the temperature signal output of a Honeywell T7047C electronic thermostat TEMP 0 located for sensing outside atmospheric temperature, the connection being made through four series-connected normally closed contacts 66, one from each of the push button switches 38 for the four HVAC zones.

Normally, therefore, the micro-ammeter 42 reads the outside atmospheric temperature as indicated by the thermostat TEMP 0, and the zone selector switch 40 will be set at one of its four zone positions, for example, zone 1 as shown in FIG. 3. Then, if the push button switch 38 for zone 1 is operated, the various aforesaid contacts of the switch 38 act simultaneously as follows: The normally open contacts 56 close to connect the thermostat TEMP 1 to the loading resistor 64 and micro-ammeter 42, while the normally closed contacts 58 open to disconnect the thermostat TEMP 1 from the responsive means 24 for zone 1. The normally open contact 60 closes to connect the dummy load resistor 62 (which has a resistance selected to have the same effect on the responsive means 24 as a signal from the thermostat TEMP 1 indicating a 70 degree temperature in the monitored space) to the input leads for temperature signals for the zone 1 responsive means 24. The normally closed contact 66 in the zone 1 push button switch 38 disconnects the outside temperature electronic thermostat TEMP 0 from the loading resistor 64 and the micro-ammeter 42, and the total effect is that the micro-ammeter 42 now reads the monitored temperature in HVAC zone 1, and the responsive means 24 for zone 1 causes the HVAC apparatus in zone 1 to operate as though the monitored temperature in that zone was 70 degrees, in response to the effect of the dummy load resistor 62.

If a push button switch 38 for a zone other than that set on the selector switch 40 should be pushed, the outside temperature thermostat TEMP 0 will be disconnected from the micro-ammeter 42, the respective zone thermostat TEMP 1-TEMP 4 will be disconnected from the responsive means 24 for that zone, and the dummy load 62 for that zone will be connected to the responsive means 24 for that zone, but no thermostat will be connected to, and no temperature reading can be indicated by, the micro-ammeter 42.

Thus the system is fool proof for temperature readings: It provides no possibility for inadvertently reading the temperature in a zone other than that set on the selector switch 40, avoids the possibility of having two temperature signals applied simultaneously to the micro-ammeter 42 to cause a false reading, and reads that zone temperature when the pushbutton switch 38 for that zone is pushed by use of the same sensor or thermostat TEMP 1-TEMP 4 that is used for controlling the temperature in that zone.

The selective overriding capability of the toggle switches 34 provides the opportunity for maximum economy in the use of the time-programmed apparatus when it is only necessary to operate some of the apparatus in contradiction to the programming, by allowing only the portions or individual elements of the apparatus connected to selected individual load time-programming channels to be operated, rather than bypassing the entire time-programmed apparatus load on all channels as has been necessary in the past in this type of control apparatus. Also, by limiting the bypassing even of individual time-programming channels to a predetermined period, such as 30 minutes, any extended wasteful (though necessary) use of the apparatus must be consciously accomplished—inattention will result in less waste, rather than more as in the usual situation.

The particular embodiment disclosed in full detail herein and illustrated in the drawings has been provided for disclosure purposes and is not intended to limit the scope of the present invention, which is to be determined by the scope of the appended claims.

I claim:

1. A controller for the power supply system of a structure having multiple zones therein with separate heating, ventilating and air-conditioning apparatus for individual zones, said structure having other separate apparatus associated therewith and having means at said controller for automatically selectively controlling the availability for operation of individual elements of said separate apparatus on power demand and time bases, wherein the improvement comprises means at said controller for selectively overriding said availability controlling means for selectively allowing individual elements of said separate apparatus to be available to operate independent of said controlling on said time bases, means associated with said separate apparatus for individually monitoring environmental conditions in at least some of said zones, means responsive to said monitoring means and connected thereto for causing the corresponding separate apparatus to operate during the existence of predetermined environmental conditions in a zone so monitored subject to said availability, selective means at said controller for determining and displaying the measure of said environmental conditions in a zone so monitored as sensed by said monitoring means, and said selective means at said controller comprises means for simultaneously for a selected zone (a) disconnecting said monitoring means from said responsive means, (b) connecting said monitoring means to said determining and displaying means for said determining and displaying said sensed environmental condition measure, and (c) connecting a dummy load to said responsive means while said monitoring means is so disconnected therefrom.

2. A controller for the power supply system of a structure having multiple zones therein with separate heating, ventilating, and air conditioning apparatus for individual zones, said controller including means associated with said separate apparatus for monitoring environmental conditions in at least some of said zones, means responsive to said monitoring means and connected thereto for causing the corresponding separate apparatus to operate during predetermined environmental conditions, and means for selectively determining and displaying the measure of said environmental conditions as sensed by said monitoring means, wherein the improvement comprises selective means at said controller for simultaneously (a) disconnecting said monitoring means from said responsive means, (b) connecting said monitoring means to said determining and displaying means for said determining and displaying said sensed environmental condition measure, and (c) connecting a dummy load to said responsive means while said monitoring means is so disconnected therefrom.

3. A controller according to claim 1 or 2 and characterized further by means at said controller for monitoring and indicating elapsed running time and number of cyclings of at least some of the elements of said apparatus.

4. A controller according to claim 1 or 2 and characterized further by means at said controller for monitoring and indicating elapsed running time and number of cyclings of at least some of the elements of said separate apparatus and for indicating the operating status of at least some of the elements of said separate apparatus.

5. A controller according to claim 1 or 2 and characterized further by means at said controller for indicating the operating status of at least some of the elements of said separate apparatus.

6. A controller according to claim 1 and characterized further in that said means for selectively overriding said availability controlling means comprises means for causing said overriding to occur for predetermined periods of time.

* * * * *